Figure 1:
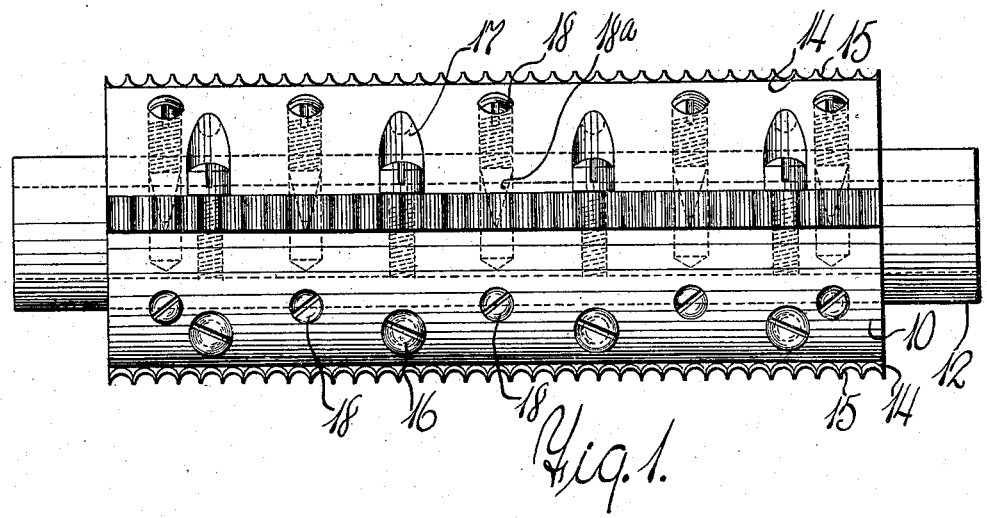

J. R. KEENE.
CUTTER HEAD.
APPLICATION FILED APR. 22, 1908.

924,078.  Patented June 8, 1909.

Witnesses:  
Frank T. Stubbs  
Ralph Lancaster

Inventor  
John R. Keene  
By his Attorney  
W. P. Hutchinson

UNITED STATES PATENT OFFICE.

JOHN R. KEENE, OF NYACK, NEW YORK, ASSIGNOR OF ONE-HALF TO CHARLES A. TATUM, OF NEW YORK, N. Y.

CUTTER-HEAD.

No. 924,078.   Specification of Letters Patent.   Patented June 8, 1909.

Application filed April 22, 1908. Serial No. 428,669.

*To all whom it may concern:*

Be it known that I, JOHN R. KEENE, of Nyack, Rockland county, New York, have invented a new and useful Improvement in Cutter-Heads, of which the following is a full, clear, and exact description.

My invention relates to improvements in cutter heads, and especially to cutter heads which are adapted for use in cutting veneer and similar thin stock into match splints.

My invention is further especially intended to cut stock of this kind into splints which are circular in cross section and which are known to the trade as round splints. It is desirable to make such splints from soft wood which veneers well, owing to the relative cheapness of the wood.

The object of my invention is to produce a cutter head in which a series of cutters having concave or semi-circular recesses in their faces, can be used to make corresponding shapes on the stock which is operated on by the cutter head, and more especially to provide an easy and secure means of fastening and adjusting the cutters so that when the cutter head is rotated at a high rate of speed there is no danger of the cutters breaking loose and flying off the cutter head.

My invention is further intended to produce an adjusting mechanism by which if the cutters become worn they can easily be set out the desired distance and will still be firmly backed and securely held. The cutter head is further intended to have the cutters applied in such a way that they will project radially from the cutter head and will have their cutting edges all in alinement so that the cutters may be simultaneously and accurately sharpened by turning the head opposite a suitable tool.

Reference is to be had to the accompanying drawings forming a part of this specification, in which similar reference characters indicate corresponding parts in all the views.

Figure 2:
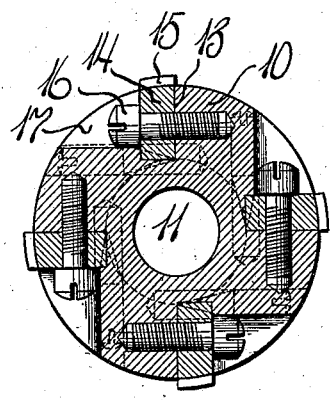

Figure 1 is a front elevation or plan of my improved cutter head, the front elevation and plan being similar. Fig. 2 is a cross section thereof, and Fig. 3 is a cross section showing a slightly modified means of adjustment.

The cutter head 10 is of a generally cylindrical shape, and it has a bore 11 and is adapted to fit on a suitable shaft 12. The cutter head is longitudinally recessed as shown at 13, to provide for receiving the cutters 14, and these recesses are preferably a little off the center and there can be any desired number of them. In practice four is sufficient, as suitable clearance is necessary between the several cutters. The cutters 14 are each provided with a series of serrations 15 on the edges, the higher points of which form cutting edges and the concave parts of which are semi-circular in shape so as to properly shape the stock against which the cutters are forcibly pressed. It will be noticed by reference to the drawings that these serrations on the several cutters aline and so it is an easy matter to sharpen the cutters as the whole cutter head can be turned against a suitable tool which will fit the outline of the cutters and so sharpen up the edges. The cutters are fastened by screws 16 which are tangentially arranged and project transversely through the cutters. A little clearance can be provided in the screw holes to provide for adjustment of the cutters. The heads of the screws fit in recesses 17 so that they will not project beyond the surface of the cutter head 10. The cutter head is also provided with tangentially arranged screws 18 having tapering points $18^a$ (see Fig. 1) which are left plain and which enter behind the cutters 14, these screws being headless, and by loosening the screws 16, then turning in the screws 18, the cutters can be forced out a little and the screws 16 can then be re-tightened so as to hold them in place. It will be seen that the screws 16 hold the cutters securely, and that as they fit snugly in the recesses 13, they are very rigidly and securely held and there is no danger of their flying out.

Figure 3:
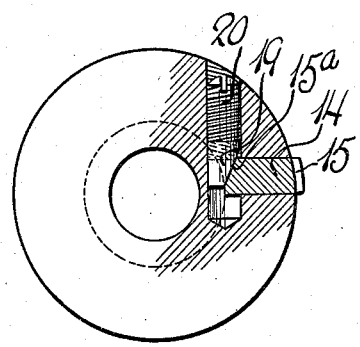

In Fig. 3 I have shown a cutter 14 slightly beveled on the back as at $15^a$, where it meets a wedge 19 which fits the bevel of the cutter 14, and a screw 20 is arranged behind the wedge, so that by turning in the screw the wedge can be made to force out the cutter 14. This is fastened in the manner already described, but not shown in Fig. 3.

It will be noticed that so far as the adjustment of the cutters is concerned, I get a screw operated wedge whether it is fixed on the screw or operated independently thereof.

Having thus fully described my invention, I claim as new and desire to secure by Letters Patent:—

1. A cutter head, comprising a solid body having longitudinal recesses therein, cutters fitting snugly in the recesses and projecting from the face of the cutter head, tangential holding screws recessed in the cutter head and passing through the cutters, and other tangential screws in said head angularly disposed as to the cutters and adapted to adjust the same in and out.

2. A cutter head comprising a solid body having longitudinal recesses therein, cutters fitting snugly in the recesses and projecting from the face of the cutter head, said cutters having alining serrations on their cutting faces, tangential holding screws recessed in the cutter head and passing through the cutters and threaded in the head, and other tangential screws threaded in said head angularly disposed as to the said cutters, and adapted to adjust the same in and out.

JOHN R. KEENE.

Witnesses:
   CHAS. A. MORRELL,
   WM. S. GREEN.